Patented Aug. 25, 1931

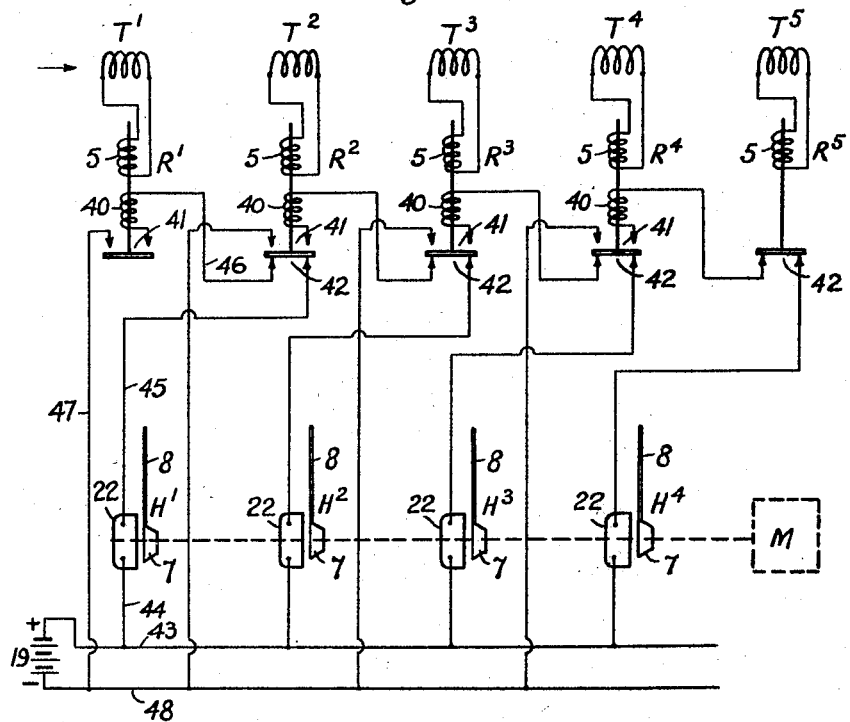
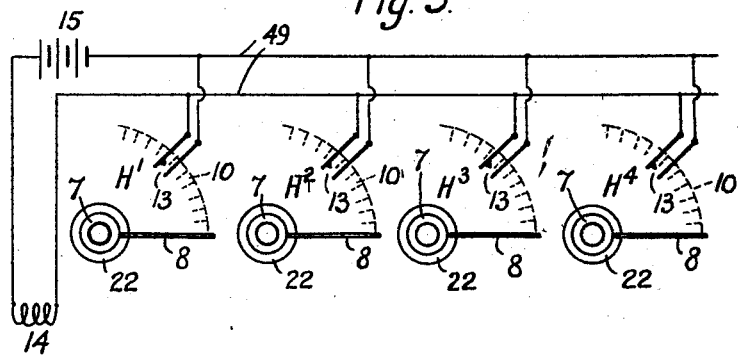

1,820,042

UNITED STATES PATENT OFFICE

WOLFGANG BÄSELER, OF MUNICH, AND AUGUST MEYER, OF BERLIN-SCHONEBERG, GERMANY

SPEED RESPONSIVE APPARATUS

Application filed August 23, 1930, Serial No. 477,330, and in Germany June 24, 1926.

This invention relates to speed responsive apparatus and particularly to apparatus of this character adapted for use in connection with car retarding devices employed for controlling the speed of vehicles in hump yards and the like.

In the operation of car retarding devices in hump yards it is customary to control the braking action exerted by the devices from a convenient point of observation and in order that the cars may be brought to rest at a desired point in the track it is necessary for the operator controlling the braking to adjust the braking effort exerted so that the vehicles will leave the retarding device at a speed appropriate to the point at which the vehicles are to be brought to rest. Experience has shown that even after long practice it is difficult for the operator to estimate by observation alone whether the desired speed has been attained for this purpose and accordingly one of the objects of the invention is to provide improved means for indicating at any desired point, the speed at which a vehicle is travelling along a track.

Another object of the invention is to provide means for automatically controlling the operation of car retarding or braking apparatus in accordance with the speed of the vehicle passing therethrough.

Figure 1:
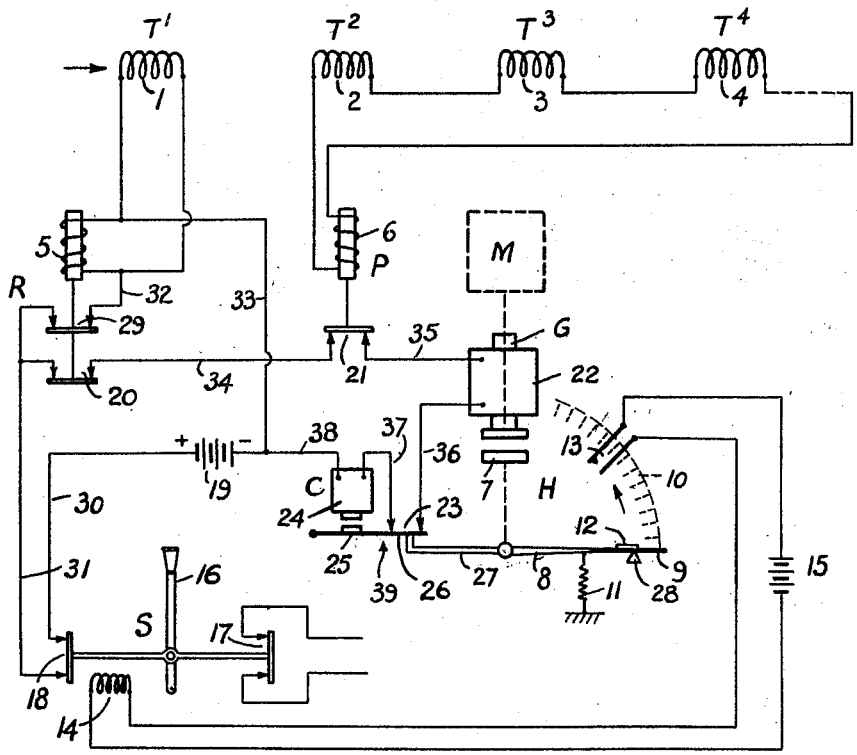
Figure 4:
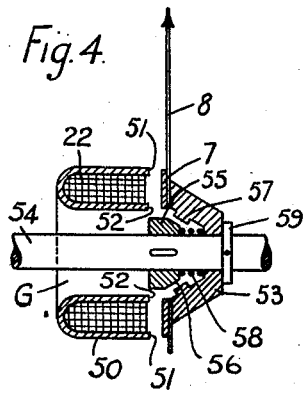

The invention is illustrated by way of example in the accompanying drawings of which Fig. 1 is a diagrammatic view of one form of speed indicating and controlling apparatus embodying the invention, Figs. 2 and 3 being similar views of another form of apparatus also embodying the invention. Fig. 4 is a detail sectional view of an element of the apparatus shown in Figs. 1, 2, and 3.

Referring now first to the form of speed indicating and controlling apparatus shown in Figure 1 it will be seen that the apparatus comprises a plurality of track devices $T^1$, $T^2$, $T^3$, $T^4$, located at suitably spaced intervals along a track (not shown) traversed by the vehicle the speed of which is to be indicated. The track devices $T^1$, $T^2$, $T^3$, $T^4$, are adapted to be influenced by the passage of the vehicle in such a manner that as the vehicle passes each device an electric current is caused momentarily to flow in the circuit of the device. As here shown the track devices $T^1$, $T^2$, $T^3$, $T^4$ are of the inductor type, each comprising a winding 1, 2, 3, 4, adapted to be inductively influenced by the passage of the vehicle so as to cause a current impulse to traverse the winding of the inductor. This action may be accomplished in various ways but preferably the inductor windings are arranged to be traversed by the magnetic flux utilized for braking purposes in car retarding apparatus hereinafter referred to, the reluctance of the flux circuit at each inductor winding being arranged to be modified by the passage of a wheel of the vehicle.

It will thus be apparent that as the vehicle moves along the track in the direction indicated by the arrow, current impulses are generated in the windings 1, 2, 3, 4, of the track inductors $T^1$, $T^2$, $T^3$, $T^4$, in succession, the intervals of time separating successive impulses being dependent upon the speed of the vehicle and upon the space intervals separating the several inductors.

The terminals of the winding 1 of the first track inductor $T^1$ are connected to the terminals of the energizing winding 5 of a relay R and the windings 2, 3, 4 of the inductors $T^2$, $T^3$, $T^4$ are connected in series with one another to the terminals of the energizing winding 6 of a relay P.

The speed indicating and controlling device is indicated at H as comprising an electro-magnet G adapted to be continuously rotated at a constant speed by means of a motor M of any suitable type. The electro-magnet G is provided with a rotatable armature 7 of magnetizable material so mounted as to be capable of rotation about the same axis of rotation as the electro-magnet G, the armature 7 being rotated by the electro-magnet when the latter is energized. It will thus be seen that the electro-magnet G constitutes an electro-magnetically controlled coupling for transmitting the rotation of the motor M to the armature 7. The latter is operatively connected to a rotatable arm 8 terminating in a pointer 9 adapted to move over a scale 10 which is graduated in any desired units of speed. The arm 8 is arranged to be rotated in the direction indicated by the arrow when the electro-magnet G is energized, this rotational movement of the arm 8 being effected against the action of a controlling spring 11. The arm 8 is provided with a contact piece 12 adapted when the arm 8 has been rotated through a predetermined arc to engage with and cause the closure of contacts 13 which are adapted to be adjustably positioned at any desired point in the path of the arm 8. The contacts 13 are connected in the circuit of the release coil 14 of a manually operated controlling switch S in series with a battery 15 from which the coil 14 is supplied with current.

The switch S is provided with an operating handle or lever 16 and when in its closed position shown in the drawings is arranged to complete at the switch contacts 17 the circuit of an electrically operated or controlled car retarding device, not shown, which is located on the track adjacent to the inductors $T^1$, $T^2$, etc. The switch S is adapted when closed to be retained in its closed position by a latch mechanism or its equivalent which is released by the energization of the release coil 14. In its closed position the switch S also closes contacts 18 included in the circuit of a battery 19 including contacts 20 of the relay R, contacts 21 of the relay P, the energizing coil 22 of the electro-magnet G, contacts 23 of a cut-out relay C and the energizing coil 24 of the relay C.

The cut-out relay C comprises an armature 25 carrying a contact-arm 26 adapted to engage with the contacts 23 as shown when the coil 24 is energized.

The contact-arm 26 is adapted to be engaged by an arm 27 secured to the arm 8 of the indicating device H when the arm 8 is in its inoperative position, as shown, in which position the arm 8 is maintained against a stop 28 by the action of the controlling spring 11.

The relay R is provided with contacts 29 included in a stick circuit for the relay winding 5.

The operation of the apparatus is as follows:—

Let it be assumed that a train of vehicles is travelling along the track in the direction of the arrow and that it is desired to effect such a reduction in the speed of the vehicles as to cause their coming to rest at a desired point.

The operator will for this purpose operate the switch S to its closed position shown in the figure in which the contacts 17 are closed so as to render operative the car retarding device through which the vehicles pass. The switch S having been thus closed will be held in its closed position by the latch mechanism above referred to until this mechanism is released by the energization of the release coil 14.

With the switch S in its closed position, the contacts 18 are closed and the passage of a vehicle over the first inductor $T^1$ causes as above explained a momentary current impulse in the inductor winding 1. This current impulse traverses the energizing winding 5 of the relay R and causes the relay armature to pick up, closing the relay contacts 20 and 29. The closure of the contacts 29 closes a stick circuit for the relay R which may be traced from the positive terminal of the battery 19 through wire 30, contacts 18, wire 31, contacts 29, wire 32, relay winding 5, wire 33, to the negative terminal of the battery 19. The relay R having thus been energized by the current impulse from the inductor $T^1$ remains energized until the switch S is opened as will be hereinafter described.

The relay P remains in its deenergized position shown in the figure until the vehicle passes over track inductor $T^2$ and until this occurs a circuit is completed from the positive terminal of the battery 19 through wire 30, contacts 18 of switch S, wire 31, contacts 20 of relay R, wire 34, contacts 21 of relay P, wire 35, energizing coil 22 of electro-magnet G, wire 36, contacts 23 of cut-out relay C, wire 37, energizing coil 24 of relay C and wire 38 to the negative terminal of battery 19.

The electro-magnet G being thus energized, the armature 7 is rotated, and causes the arm 8 to move in the direction indicated by the arrow towards the contacts 13. This movement of the arm 8 causes the arm 27 to move away from the contact arm 26 but the latter is retained in the position shown in which the contacts 23 are closed owing to the cut-out relay C being energized.

As soon as the vehicle passes over the track inductor $T^2$, the current impulse generated thereby in the inductor winding 2 causes a momentary current impulse to traverse the energizing winding 6 of the relay P with the result that the contacts 21 being thereby opened, the energizing circuit of the coil 22 of the electro-magnet G and of the coil 24 of the cut-out relay C is interrupted. The armature 7 is thus no longer rotated by the electro-magnet G and the arm 8 is consequently arrested in its movement and returns to the position shown under the action of the controlling spring 11.

The ultimate position attained by the arm 8 before its arrest as above explained indicates by means of the position of the pointer 9 relative to the scale 10, the speed of the vehicle since this position is dependent upon the time taken by the vehicle to traverse the distance between the inductors $T^1$ and $T^2$. So long as this speed is sufficiently great to cause the arrest and return of the arm 8 before reaching the contacts 13, the braking action of the car retarding device will continue since the release coil 14 of the switch S is not energized.

The deenergization of the coil 24 of the cut-out relay C permits the armature 25 of the relay C to fall away and to engage with a stop 39 thereby opening the contacts 23. The latter are consequently not reclosed until the arm 8 of the device H has fully returned to the position shown in which these contacts are reclosed by the action of the arm 27.

In the event however of the speed of the vehicle having been decreased by the action of the car retarding device to such an extent that the arm 8 has been rotated to such an extent as to bring the contact piece 12 into engagement with the contacts 13 before the arm 8 is arrested and returns to its original position, the contacts 13 will be closed and will effect the supply of current from the battery 15 to the release coil 14 of the switch S and thus cause this switch to be automatically opened and to suspend the braking action of the car retarding device.

It will be apparent that assuming that the contacts 13 are not closed by the action of the arm 8, this arm after the vehicle has passed the inductor $T^2$, will again be rotated in the direction of the arrow until the arm 8 is again arrested and permitted to return to its original position when the vehicle passes over the track inductor $T^3$, a similar action taking place as the vehicle passes over the inductor $T^4$.

The speed indicating device H will thus by means of its pointer 9 give an indication of the speed of the vehicle as the latter passes over the successive sections of the track separating the track inductors $T^1$—$T^2$, $T^2$—$T^3$, and $T^3$—$T^4$, while when the speed of the vehicle has been reduced at any stage of its progress over these track sections to the desired value, the contacts 13 will be closed by the action of the arm 8 so as to cause the braking action of the car retarding device to cease.

Referring now to the form of apparatus shown in Figures 2, 3 and 4, each of the track inductors $T^1$, $T^2$, $T^3$ etc. is in this case arranged to supply a current impulse, as a vehicle passes the inductor, to a separate relay. These relays are indicated at $R^1$, $R^2$, $R^3$ etc. and each comprises a pick-up winding 5 and a stick winding 40 with the exception that the relay $R^5$ corresponding to the last track inductor $T^5$ is provided with a pick-up winding 5 only.

The relays $R^1$, $R^2$, $R^3$, $R^4$, are each provided with front contacts 41, and the relays $R^2$, $R^3$, and $R^4$ are also provided with back contacts 42. The last relay $R^5$ is provided with back contacts 42 only.

A separate speed indicating and controlling device is provided for each of the track sections between the track inductors and these devices being indicated in Figures 2 and 3 at $H^1$, $H^2$, $H^3$ and $H^4$ respectively.

Each of the devices $H^1$, $H^2$, $H^3$, $H^4$, is similar to the device H already described with reference to Figure 1 and comprises an electro-magnet having an energizing coil 22 and a rotatable armature 7 carrying an arm 8, the latter being adapted to move over a graduated speed indicating scale 10 and to engage with adjustable control contacts 13. The contacts 13 are connected in parallel with one another to control wires 49 through which the release coil 14 of controlling switch device corresponding to that indicated at S in Figure 1 is at times supplied with current from a battery 15.

The electro-magnets of the speed indicating devices $H^1$, $H^2$, $H^3$, and $H^4$ are arranged to be driven by a common shaft which is rotated at a constant speed by means of a motor M.

Tht operation of this form of the apparatus is as follows:

A vehicle proceeding along the track past the inductors $T^1$, $T^2$, $T^3$ etc in the direction indicated by the arrow will in passing the the first inductor $T^1$ cause an impulse to be transmitted to the pick-up winding 5 of the corresponding relay $R^1$. This relay being thereby energized, will close its front contacts 41 and complete a circuit from the positive terminal of the battery 19 through wires 43 and 44, the energizing coil 22 of speed indicating device $H^1$, wire 45, back contacts 42 of relay $R^2$, wire 46, the stick winding 40 of relay $R^1$ and wires 47 and 48 to the negative terminal of battery 19.

It will be understood that the current impulse in winding 5 of relay $R^1$ is only momentary but the relay will be held in its energized position by current supplied to the stick winding 40 from the battery 19 through the circuit just traced.

The coil 22 of the electro-magnet of the indicating device $H^1$ being thus energized, the device $H^1$ will now operate to cause its arm 8 to move over the scale 10 as already described in connection with the corresponding device H of the apparatus of Figure 1.

As soon as the vehicle passes over the second track inductor $T^2$, the pick-up winding 5 of the relay $R^2$ receives a current impulse from the inductor $T^2$ with the result that the relay $R^2$ moves to its energized position and in so doing interrupts the circuit of the stick winding 40 of the relay $R^1$ so that this relay is now deenergized. The circuit through the energizing coil 22 of the electro-magnet of the device $H^1$ is also interrupted by the opening of the back contacts 42 of the relay $R^2$ so that the movement of the arm 8 of the device $H^1$ over the scale 10 will be arrested and the arm 8 will return to its original position in the manner already described.

The position attained by the arm 8 of the device H¹ before its return movement will evidently constitute an indication of the speed of the vehicle in travelling between the track inductors T¹ and T².

The energization of the relay R² due to the passage of the vehicle over the track inductor T² will cause the arm 8 of the speed indicating device H² to be moved over its scale in a similar manner until when the vehicle passes over the track inductor T³ the relay R³ is energized and effects the deenergization of the relay R² and consequently of the electro-magnet of the device H². The arm 8 of this latter device is then arrested at a position on its scale giving an indication of the speed of the vehicle between the track inductors T² and T³.

The further progress of the vehicle will evidently effect in a similar manner the successive energization of the relays R⁴ and R⁵, the corresponding speed indicating devices H³ and H⁴ being started into operation as the relays R³ and R⁴ are energized respectively. The passage of the vehicle over the last track inductor T⁵ effects the deenergization of the relay R⁴ and causes the arm 8 of the indicating device H⁴ to be arrested and to return to its original position.

It will thus be apparent that the devices H¹, H², H³ and H⁴ indicate the speed of the vehicle during its passage over the sections of tracks separating the track inductors T¹—T², T²—T³, T³—T⁴ and T⁴—T⁵ respectively.

If at any point in the progress of the vehicle over these track sections, the movement of the arm 8 of any of the speed indicating devices H¹, H², H³ or H⁴ is sufficient to cause the arm 8 to engage with and to close the contacts 13 of the device, the control wires 49 will be connected with one another at the contacts 13 thus closed so as to effect the supply of current to the release coil 14 from the battery 15, thus rendering the car retarding device inoperative as above described. The braking action is thus suspended as soon as the speed of the vehicle in any of the track sections is reduced to the desired value determined by the adjustment of the contacts 13.

Referring now to Figure 4, a preferred construction of the electro-magnetic mechanism of the speed indicating devices employed in the apparatus of Figures 1, 2 and 3 is illustrated. In this construction the electro-magnet G is stationary and comprises an annular core 50 of U-section enclosing the energizing coil 22. The right hand end of the core 50 forms concentric annular pole pieces 51, 52 opposite to which is arranged an annular armature 7 supported upon a collar 53 which is loosely mounted upon a shaft 54 adapted to be continuously rotated by the motor M shown in Figures 1 and 2. The shaft 54 carries rigidly mounted thereon a collar 55 having an annular bevelled face 56, adapted to be engaged by a corresponding internal annular projection 57 formed on the collar 53. A coil spring 58 surrounding the shaft 54 is interposed between the collars 53 and 55 and tends normally to maintain the loose collar 53 in engagement with a collar 59 secured to the shaft 54. The arm 8 of the device is attached to the collar 53 carrying the armature 7 and the operation of the device is as follows:—

So long as the coil 22 is deenergized, the rotation of the shaft 54 carrying with it the collars 55 and 59 is not transmitted to the collar 53 which is held out of engagement with the collar 55 by the action of the spring 58. The collar 53, armature 7 and arm 8 are under these conditions maintained in their normal position under the action of the controlling spring indicated in Figure 1 for instance at 11.

When however energizing current is supplied to the coil 22, the core 50 is magnetized and the armature 7 is attracted towards the pole pieces 51, 52 carrying with it the collar 53 and compressing the spring 58. This movement of the collar 53 brings the annular projection 57 on the collar 53 into frictional engagement with the bevelled face 56 of the collar 55 and the collars 53 and 55 being thereby coupled together, the collar 53 rotates with the collar 55 and shaft 54 until the coil 22 is again deenergized, whereupon the spring 58 moves the collar 53 away from the collar 55 so that the collar 53, armature 7 and arm 8 are again free to return to their original angular positions.

It will be evident that in both the forms of apparatus described the track inductors T¹, T², T³ etc. may be replaced by any other suitable devices adapted to effect the supply of current impulses to the relays. For instance the track devices above referred to may comprise contacts adapted to be closed by the passage of a vehicle, these contacts being included in circuits in which the relay windings and a suitable source of current are connected.

Although only certain embodiments of the invention have been described and illustrated it is to be understood that the invention is not limited to such embodiments or otherwise except as indicated by the appended claims.

Having now described our invention, what we claim as new and desire to secure by Letters Patent is:—

1. In speed responsive apparatus the combination of a device located on a track over which a vehicle travels, a movable indicating member, means operated by the passage of said vehicle over said device for starting said member into motion and means operated by the passage of said vehicle over a point in the track separated from said device by a predetermined interval for arresting the movement of said member.

2. In speed responsive apparatus the combination of a device located on a track over which a vehicle travels, a second device located on said track ahead of said first device in the direction of movement of said vehicle, a movable indicating member, means operated by the passage of said vehicle over said first device for starting said member into motion and means operated by the passage of said vehicle over said second device for arresting the movement of said member.

3. In speed responsive apparatus the combination of a device located on a track over which a vehicle travels, a second device located on said track ahead of said first device at a predetermined distance therefrom, a movable indicating member, means for imparting movement at a constant speed to said member, means controlled by the passage of a vehicle past said first device for coupling said movement imparting means to said member and means operated by the passage of the vehicle over said second device for disconnecting said movement imparting means from said member.

4. In speed responsive apparatus the combination of a device located on a track over which a vehicle travels, a movable indicating member, means tending to maintain said member in a predetermined position, means operated by the passage of said vehicle over said device for starting said member into motion from said position and means operated by the passage of said vehicle over a point in the track separated from said device by a predetermined interval for arresting the movement of said member.

5. In speed responsive apparatus the combination of a series of relays, means for energizing each relay in succession as a vehicle passes successive spaced points along a track over which the vehicle travels, a movable member, means for imparting movement at a constant speed to said member, electromagnetic means for coupling said movement imparting means to said member, means operated by one of said relays when energized for rendering said coupling means operative and means operated by another of said relays when energized for rendering said coupling means inoperative.

6. In speed responsive apparatus the combination of a plurality of track devices arranged at spaced intervals along a track over which a vehicle travels, a speed indicating device for each of said intervals and means operated by the passage of the vehicle over the track devices at the beginning and end of each of said intervals for setting said speed indicating device into and out of operation respectively.

7. In speed responsive apparatus the combination of a plurality of relays, means for successively energizing said relays operated by the passage of a vehicle over a series of spaced points along a track over which the vehicle travels, means operated by the passage of the vehicle over one of said points for deenergizing the relay energized by the passage of the vehicle over the adjacent point previously passed and a plurality of speed indicating devices controlled by said relays.

8. In speed responsive apparatus, the combination of a plurality of relays, means for energizing said relays in succession, operated by the passage of a vehicle over a series of spaced points along a track over which the vehicle travels, a pick-up winding for each relay, a stick winding for each relay except that corresponding to the last of said spaced points, means for supplying energizing current to each of said stick windings when said relay has been energized, means for deenergizing each of said stick windings when the next successive relay is energized and a plurality of speed responsive devices controlled by said relays.

9. In speed responsive apparatus the combination of a plurality of relays, means for successively energizing said relays operated by the passage of a vehicle over a series of points spaced at intervals along a track over which the vehicle travels, a speed responsive device for each of said intervals comprising a movable member, means for imparting movement at a constant speed to the member of each of said devices, and electrically operated means controlled by said relays for coupling and uncoupling said movement imparting means to and from the member of each of said devices in succession.

In testimony whereof we have hereunto set our hands.

WOLFGANG BÄSELER.
AUGUST MEYER.